Feb. 10, 1953   B. G. COPPING   2,628,032
AUTOMATIC THERMOSTATIC CONTROL DEVICE
Filed Nov. 19, 1948
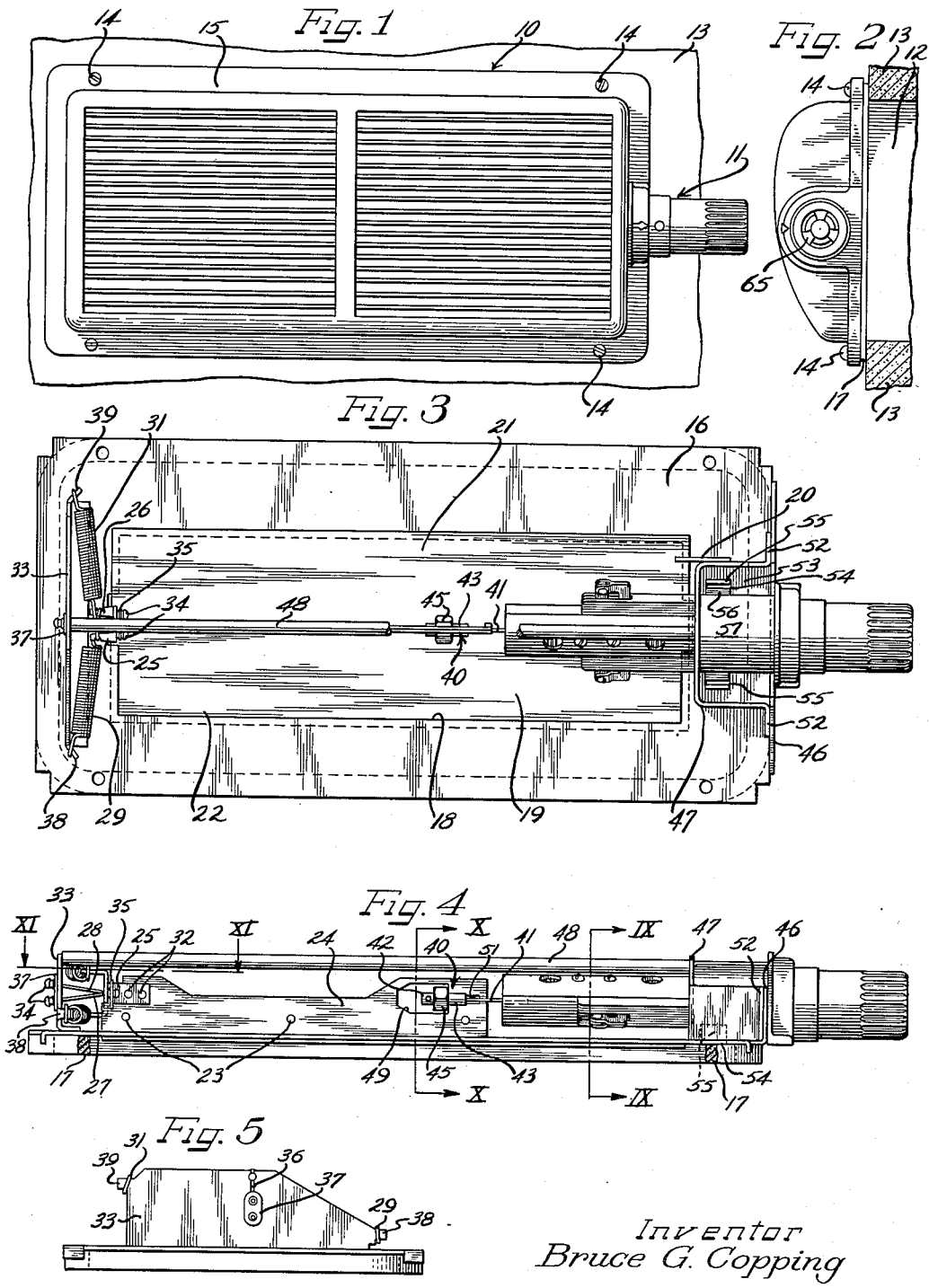
Inventor
Bruce G. Copping Feb. 10, 1953   B. G. COPPING   2,628,032
AUTOMATIC THERMOSTATIC CONTROL DEVICE
Filed Nov. 19, 1948   3 Sheets-Sheet 2
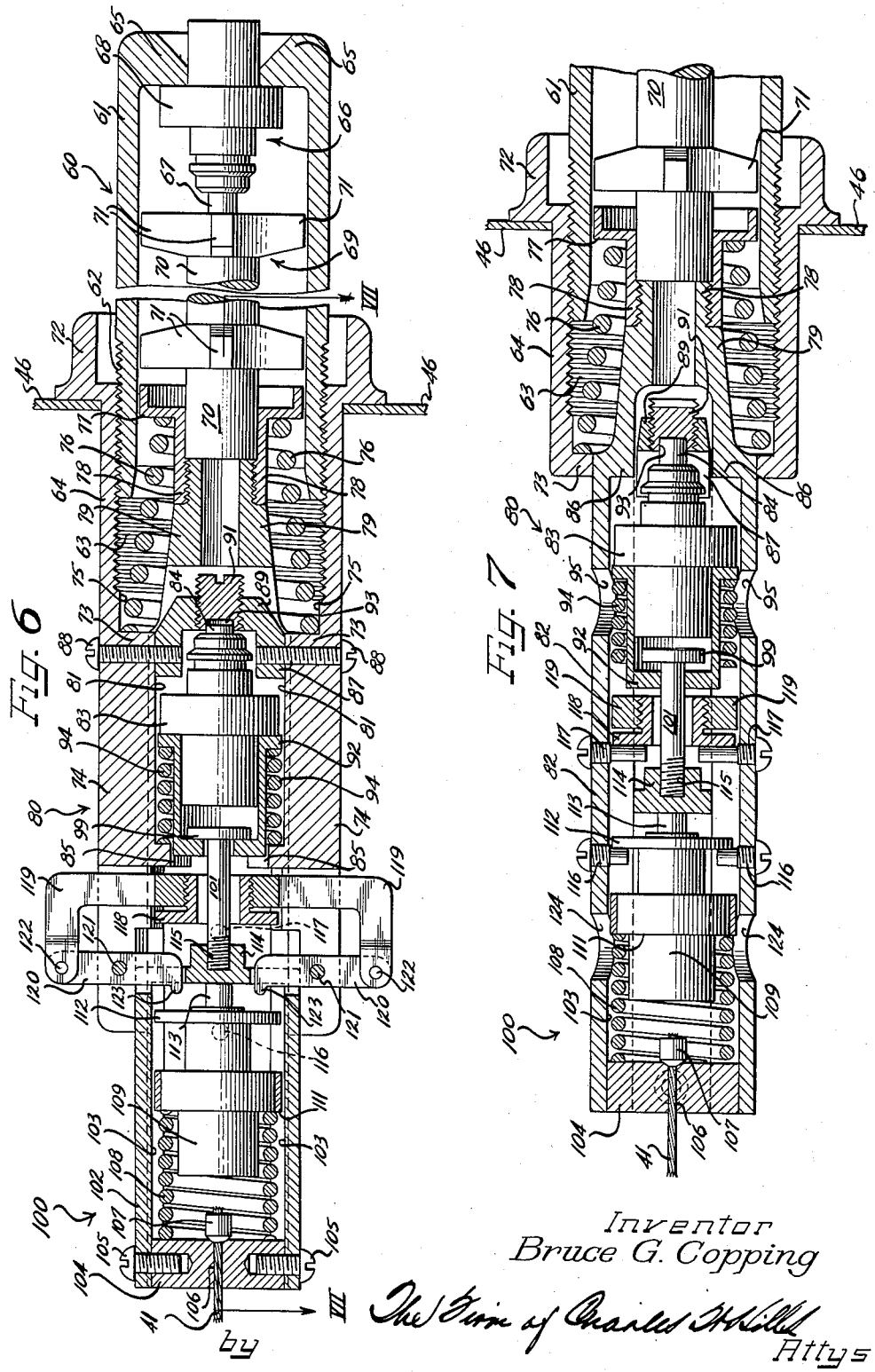
Inventor
Bruce G. Copping
by The Firm of Charles H. Hill
Attys Feb. 10, 1953  B. G. COPPING  2,628,032
AUTOMATIC THERMOSTATIC CONTROL DEVICE
Filed Nov. 19, 1948  3 Sheets-Sheet 3
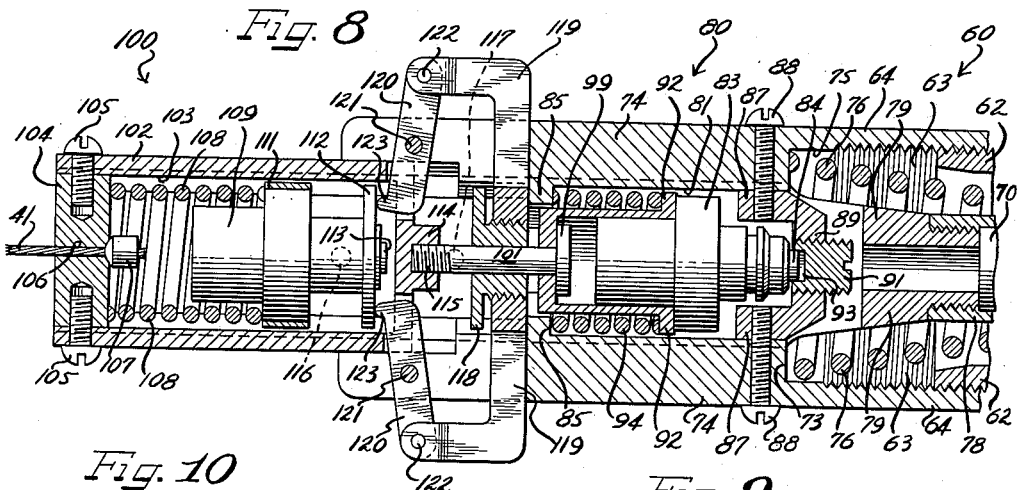
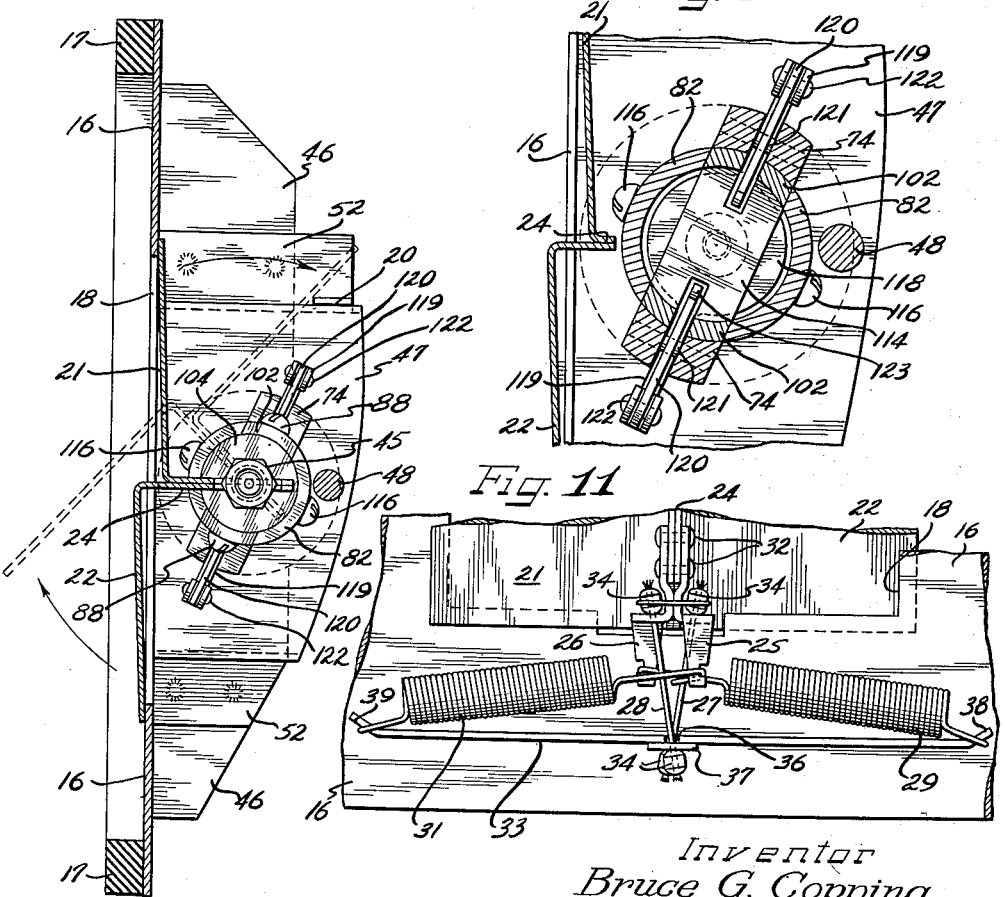
Inventor
Bruce G. Copping Patented Feb. 10, 1953

2,628,032

UNITED STATES PATENT OFFICE 2,628,032

AUTOMATIC THERMOSTATIC CONTROL DEVICE

Bruce Gray Copping, Cuyahoga Falls, Ohio, assignor to Don Manufacturing Company, Chicago, Ill., a corporation of Illinois Application November 19, 1948, Serial No. 60,852

11 Claims. (Cl. 236—1)

My invention relates to thermostatic appliances and more particularly relates to improved thermostatic means for automatically actuating, controlling, or regulating the movements of dampers or shutters and similar devices which control or regulate temperatures and air conditions in spaces which are artificially temperature conditioned irrespective of whether the spaces are to be heated or cooled.

The present subject matter constitutes a continuation-in-part of that disclosed in my copending application, Serial No. 708,224, filed November 7, 1946, now Patent 2,523,497 issued September 26, 1950.

In accordance with one form which my invention may take, the ducts of an air distribution system are provided with a plurality of individual outlets to spaces or zones which are to be temperature conditioned. Positioned in each outlet is a thermostatically controlled shutter for the purpose of automatically controlling the flow of heating or cooling air into a given space. Shutter controls which are responsive to space temperatures generally urge a shutter to a closed position as room temperature rises when the air distribution system is used for heating purposes. Conversely, if the air distribution system is to be used for cooling purposes, the shutter is urged to an open position as the space temperature rises. Thus, in the past, shutter controls have had to be built for heating or for cooling but could not be used to control both heating and cooling. My invention provides means for automatically converting a single thermostatically controlled shutter from a heating control unit to a cooling control unit or vice versa. This, therefore, forms one object of my invention.

Another object of my invention is to provide improved thermostatic means for controlling the flow of temperature conditioned air into spaces which are either to be heated or cooled.

Another object of my invention is to provide control dampers which will allow adequate ventilation when the operating temperature range is such as to normally inactivate thermostatic control.

Still another object of my invention is to provide a self-converting thermostatically regulated damper control which converts small linear displacement into relatively large angular displacement thereby effecting accurate control within a very limited compact space.

It is a further object of my invention to provide a thermostatic appliance which automatically converts to use as a heating control or a cooling control which is of simplified mechanical construction and which requires a minimum of manual adjustment.

Another object of my invention is the provision of a device that is convenient and satisfactory for its intended purpose.

Many other objects will appear from the following description and the appended claims.

For a more complete understanding of the invention, reference may be had to the following detail description and accompanying drawings, in which:

Figure 1 is a front view of a shutter installation embodying one form of the present invention;

Figure 2 is a side elevation of the shutter installation shown in Figure 1;

Figure 3 is a slightly enlarged view of the shutter installation shown in Figure 1 with louvre shell or grill section removed to show the complete thermostatic control device incorporating the principles of my invention;

Figure 4 is a bottom view showing additional details of the shutter installation and control device shown in Figure 3;

Figure 5 is an end view showing construction details of the shutter installation and control device shown in Figure 3;

Figure 6 is an enlarged cross-section taken through the entire length of the thermostatic control device showing the details of the device;

Figure 7 is a cross-section taken through a portion of the thermostatic control device on a plane represented by section VII—VII, Figure 6;

Figure 8 is an enlarged view of one end of the control device and is sectionalized as in Figure 6 to show the operative details of certain members during one phase of its operation;

Figure 9 is a cross-sectional view taken through section IX—IX, Figure 4;

Figure 10 is a cross-sectional view through section X—X of Figure 4; and

Figure 11 is a cross-sectional view through section XI—XI of Figure 4.

As shown on the drawings:

Referring first to Figures 1 and 2 of the drawings, a thermostatically controlled ventilator is herein indicated as comprising an air register shown generally at 10 and a temperature responsive regulator indicated generally at 11. This ventilator is associated with a delivery duct 12, the discharge end of which is defined by an opening in a wall or other supporting structure generally indicated at 13. In this particular embodiment I have shown how a suitable connection of the ventilator to the duct may be accomplished by a plurality of screws 14 passing through a louvred mounting plate 15, a ventilator frame 16 (Figure 3), a rubber gasket 17 and into the wall 13.

The construction of the inner portion of the ventilator of Figures 1 and 2 is shown in further detail in Figures 3, 4 and 5, as well as in Figure 10. It will be noted that the frame 16 is shown as providing an opening 18. A shutter 19, comprising an upper blade 21 disposed above the opening and a bottom blade 22 disposed below the opening, as may most clearly be seen in Figure 10, is longer and wider than the opening 18, thereby effecting a sealed engagement with the frame 16 when the shutter 19 is in a closed position, thereby effectively controlling communication between the duct 12 and the space which is to be temperature conditioned. The blades 21 and 22 are joined as shown on Figures 4 and 10 by rivets 23 or other suitable connecting means to form a flange 24 by bending the blades 21 and 22 into an L shape.

The shutter 19 is positioned in the opening 18 by means of a cord suspension arrangement, the details of which will now be described.

Affixed to one end of the shutter 19 (left side of Figures 3 and 4) are a pair of fingers 25 and 26 suitably bent to form a double flange and slit to provide notched receptacles in said flanges for anchoring and accommodating a suspension wire 27, a suspension wire 28, a return spring 29, and a return spring 31. The fingers 25 and 26 are joined to the flange 24 of the shutter 19 and to each other by a plurality of rivets 32 or other suitable means.

Disposed at right angles to the ventilator frame 16 is a flanged metal end support 33 which is secured to the frame 16 by spot welding, or other suitable means. The suspension wire 27 and the suspension wire 28 extend from the fingers 25 and 26, respectively, to the end support 33 and are retained longitudinally by means of a plurality of nubbins 34 which are press clamped to the end portions of the suspension wires 27 and 28. The nubbins bear against the notch receptacles of fingers 25 and 26 and positioning plate 37.

The suspension wires 27 and 28 are restrained against movement within a transverse plane defined by the notched receptacles of the fingers 25 and 26 by a wire bent to form a clamp 35, which engages the nubbins 34 in a locking relationship. The opposite ends of the suspension wires 27 and 28 are positioned within a vertical end support notch 36 and a positioning plate 37.

Thus, it will be noted that the suspension wires 27 and 28 are disposed in one plane at their points of contact with the end support 33 and are disposed at their points of contact with the fingers 25 and 26 in a plane which is substantially normal to said one plane when the shutter 19 is closed. This results in a partial twist of the suspension wires which, in turn, imparts a torsional force to the shutter 19 and tends to rotate the shutter toward an open position when the shutter 19 is tensioned rightward.

Rotative opening displacement of shutter 19 is limited by a stop 20 which is soldered or otherwise attached in a suitable position to the frame structure. (Dotted lines in Figure 10 show the shutter 19 at maximum open position.)

Referring to Figures 3, 4 and 11, the return spring 29 is positioned alongside the end support 33 and is hooked into the notched receptacle of the finger 26 and attached to an ear 38 projecting from the end support 33.

The return spring 31 is positioned alongside the end support 33 and is hooked into the notched receptacle of the finger 25 and attached to an ear 39 projecting from the end support 33.

Inasmuch as the notch receptacles contained in the fingers 25 and 26 lie in two different planes, the spring tension of the return springs 29 and 31 produce a twisting moment, the resultant of which operates to subject the shutter 19 to a torsional force. The quantitative proportions of this force will vary as shutter 19 is moved through different angular displacements. The operative effect of such a return spring assembly is to bias the shutter suspension assembly toward the closed position whenever the rightward tension on the shutter 19 is diminished, until a condition of torsional balance is obtained. Accurate thermostatic control of the suspension assembly is thereby made possible.

The other end of the shutter 19 (right side—Figures 3 and 4) is supported by a tension wire 41 secured to the flange 24 by means of an adjustable wire socket arrangement, indicated generally at 40, comprising a socket clamp 42, a hollow standard 43 having threads cut upon a substantial portion of one end and notched upon the other end, and a socket nut 45 threaded so as to engage the threads on the standard 43 in a nut and bolt relationship. The flange 24 has an appropriate opening 49 and a slit 51 formed therein (right side—Figure 4) to accommodate the adjustable wire socket assembly.

The notched end of the standard 43 engages the slit 51 of the flange 24 in a sliding fit thereby restrictively supporting the shutter 19 with respect to relative angular displacement. The tension wire 41 passes through the hollow standard 43 and the socket nut 45 but at its outer extremity (right—Figure 4), is connected to a thermostatic control device and at its inner extremity, is clamped securely by socket clamp 42.

It should be apparent that this arrangement facilitates simple manual adjustment of the effective operating length of the tension cord 41. Inasmuch as the socket nut 45 bears against the wall defining the opening 49 in the flange 24 and the socket clamp 42 operates to lock the tension wire 41 by bearing against the walls of the hollow standard 43, a manual adjustment of the socket nut 45 may be effected to selectively alter the longitudinal alignment of the cord suspension mechanism. Adjustment of the length of the cord suspension in this manner enables a factory calibration of the shutter unit. In other words, a predetermined tension may be established in the unit in accordance with the effective operating limits of the thermostatic control device associated with the shutter suspension assembly.

I have also found that a calibration setting made with the described arrangement may be locked into place to prevent changes in adjustment by sealing the threaded fit of the socket nut 45 and the standard 43 with Glyptal or some other suitable cement.

My shutter cord suspension arrangement is preferably equipped with 21-strand stainless steel aircraft type cable since I have found by experiment that this cable achieves results nearest to those expected from a theoretically perfect cord because of its relatively small opposition to bending and twisting.

As may best be seen on Figures 3, 4 and 10, the frame 16 is flanged upward at one end to form an end support 46. Affixed thereto is a box 47 which is spot welded to the end support 46 through a pair of toes 52. The box 47 forms an enclosure 53 for housing a portion of the thermostatic control device 11, as well as to form a supporting structure for the shutter means.

A spacer bar 49 is disposed between the end support 33 and the box 47 to act not only as a spacer member but as a compression means in the shutter frame structure. This improved frame structure adequately accommodates the tensional stress variations attendant upon the use of a cord suspended shutter.

It may be noted at this point that the enclosure 53 communicates with the delivery duct 12 through a pair of spaced openings 54 which are formed in the ventilator frame 16 by bending a pair of tabs 55 inwardly into the enclosure 53.

The interior thermostatic area of regulator 11 is in communication with the enclosure 53 through a pair of spaced openings (not shown) formed in the housing 57 by bending a pair of tabs 56 outwardly. The tabs 56 and the spaced openings 54 are in registry with one another.

It will be apparent to those skilled in the art that I have described an enclosure constituting an improved and simplified aspirator structure. The purpose of this aspirator is to permit the regulator 11 to respond to the average room temperature of the space being temperature conditioned. For a more thorough understanding of aspirators of this type, reference may be had to my copending applications, Serial No. 25,838, filed May 8, 1948, and Serial No. 25,837, filed May 8, 1948, now Patents 2,523,498 and 2,523,499 issued September 26, 1950.

Referring now to Figure 6, a thermostatic control device is indicated having essentially three temperature responsive components which, for purposes of this disclosure, shall be referred to and indicated generally upon the drawings as a room thermostat 60, a tensioning thermostat 80 and a reversing thermostat 100.

The room thermostat 60 has a cylindrical adjusting knob 61 preferably made of molded plastic so that functional grip configurations may be formed in the knob. The knob 61 is also threaded at its inner extremities as shown at 62 for purposes of achieving a threaded engagement with a threaded portion 63 of a thermostat housing 64. At its outer extremities, the knob 61 terminates in a plurality of inwardly extending ribs 65, which may also be seen in the end view of Figure 2.

Disposed within the chamber formed by the cylindrical form of the adjusting knob 61 is a temperature sensitive device of the type which operates to vary the linear alignment of its members in response to changes in temperature. Preferably, this device is of the so-called "Vernet" type wherein a change in volume of a material during physical transformation from one state to another in response to temperature variations is utilized to displace a piston along a linear path. A "Vernet" device of this class is indicated generally at 66 as comprising a piston 67 and a body 68.

The ribs 65 of the knob 61 engage the body 68 to provide radial positioning support as well as to prevent outward longitudinal displacement of the "Vernet" body 68.

The piston 67 engages a spacer indicated generally at 69 comprising a plurality of radially extending fins 71 and a rod portion indicated at 70. The fins 71 are disposed on an outside diameter approximately the same as the inside diameter of the knob 61 and operate, therefore, to position the spacer 69 in the center of the room thermostat 60 assembly.

The housing 64 is of die-cast construction and has an abutment 72 which positions the control device in the end support 46. The housing 64 is cylindrical for a portion of its length and defines a cylindrical space 75 which is terminated by an annular shoulder 73.

Projecting inwardly away from the shoulder 73 of the housing 64 are two fork-like prongs indicated at 74 which serve as parts of the supporting structure for the tensioning thermostat indicated generally at 80.

Positioned within the space 75 is a conical spring 76. The smaller conical section of the spring 76 is capped by a retainer 77, which, as may be seen from the drawings, is essentially a hollow cylinder with wings or fins on one end. The bore of retainer 77 is of such a diameter as to accommodate the rod 70 of the spacer 69 and is inside-threaded as at 78 so as to provide for a threaded engagement with tension fork 79.

Turning now to the tensioning thermostat 80 as indicated generally in Figure 6, a substantially cylindrically-shaped space is indicated at 81 which is formed by the fork-shaped prongs 74 and a pair of projecting walls 82 of tension fork 79 (Figure 7).

Disposed within the space 81 is a temperature sensitive device of the general class previously described, preferably, of the "Vernet" type. As appears in Figures 6 and 7, a "Vernet" thermostat is indicated as comprising a body 83 and a piston 84.

One end of the space 81 is partially terminated by a pair of arcuate shoulders 85 formed in the prongs 74. The other end of the space 81 is terminated by a shoulder 86 (Figure 7) formed in the tension fork 79 and a support yoke 87. The support yoke 87 is secured to the prongs 74 by a plurality of machine screws 88 and is drilled and threaded through a neck portion 89 to receive in threaded engagement a set screw 91 which is positioned within the neck portion 89 for the purpose of engaging and retaining the piston 84 in a counterbore 93 formed in one end of the set screw 91.

Shouldered against the "Vernet" device body 83 and slidingly supported by the arcuate shoulders 85 of the prongs 74 is a spring sleeve 92. As indicated in Figures 6 and 7, the spring sleeve 92 is a flanged cylindrical sleeve, one end of which being capable of receiving a reduced cylindrical portion of the body 83 and having a hole in its other end for the accommodation of a pin 101. A coil spring 94 is coiled about the sleeve 92 and bears against the arcuate shoulders 85 on one end and against the flanged portion of the spring sleeve 92 on the other end.

It should be noted that the tensioning thermostat 80 communicates with the conditioning air passing through the ventilator through a pair of air ports 95 formed in the projecting walls 82.

Positioned between the projecting walls 82 of the tension fork 79 is a bobbin 102. Together, the bobbin 102 and the walls 82 define a cylindrical space 103 which houses the reversing thermostat 100.

Terminating the space 103 at one end is a plug 104 which may be secured as shown on Figure 6 by drilling and tapping the bobbin 102 and the plug 104 for threaded engagement with a plurality of machine screws 105. Plug 104 is also provided with a hole 106 large enough to accommodate the tension wire 41 but small enough to provide an adequate bearing surface for engaging a socket clamp 107 which is permanently pressed upon the tension wire 41.

Disposed within the space 103 is a coil spring 108 which cooperates with a temperature sensitive device similar to those previously described, preferably of the "Vernet" type. Such a device is shown in Figures 6 and 7 as comprising a main body 109 having a shoulder 111, a body flange 112 and a piston 113.

Terminating the space 103 on the other end is the wall portion of bobbin 102 formed to provide a boss 114 which is drilled and tapped as at 115 to receive in threaded connection the pin 101. The pin 101 has a flange 99 on its other end suitable for selective seating within the spring sleeve 92. The piston 113 of the "Vernet" device contained in the space 103 engages the boss 114 of the bobbin 102 during certain phases of operation, as will be described in separate portion of this disclosure.

The projecting walls 82 are appropriately drilled and tapped to receive in threaded relationship two pair of pin stops indicated at 116 and 117.

Positioned to the right (as appears on Figures 6 and 7) of the pin stops 117 is an adjustable flange 118 which is of a general cylindrical configuration and has a flange face suitable for engagement with the pin stops 117 and an inside diameter large enough to freely pass the pin 101. The outer surface of the flange cylinder 118 is threaded so as to engage a yoke 119.

Extending from the extremities of the arms of the yoke 119 are two beams 120 supported and arranged to pivotally oscillate about a pair of cylindrical fulcrum pins 121 and pivotally connect to the yoke 119 by means of a pair of cylindrical pins 122. The innermost extremities of the beam 120 are rounded into a rolling cam surface as at 123.

The reversing thermostat 100 communicates with the conditioning air passing through the ventilator through a pair of air ports 124 formed in the projecting walls 82.

*Operation*

In a complete heating and cooling ventilation system to which my invention would be applied, three different temperature conditions may exist in the conditioning air flowing through the ducts of the distribution system. If the system is operating as a heating unit, the temperature of the conditioning air will be over 90° F. If the system is operating as a cooling unit, the temperature of the conditioning air will be less than 65° F. If neither heating nor cooling is required, the temperature of the conditioning air circulating for purposes of ventilation lies between the limits of 65° and 90° F. This latter condition shall be referred to as the neutral phase.

The reversing thermostat 100 is designed to have its activity between 70° and 80° F. At 80° F. its temperature responsive element is fully expanded (Figures 6 and 7). Under this condition, the body 109 and the piston 113 tend to oppose each other, therefore the piston 113 bears against the inner surface of the boss 114 portion of the bobbin 102, while the body 109 tends to move to the left (in the position shown on the drawings).

The shoulder 111 of the body 109 is urged against the coil spring 108 and the flange 112 of the body 109 is carried along until it comes in contact with the pin stops 116.

If the temperature of the conditioned air is 70° F. or less, the temperature responsive element of the reversing thermostat 100 is fully contracted (Figure 8). The piston 113 is retracted into the inside of the body 109 thereby permitting the coil spring 108 to urge the body 109 toward the right. Under these conditions the flange 112 is moved away from the pin stops 116.

The tensioning thermostat 80 is designed to have its activity between 80° and 90° F. At 90° its temperature responsive elements are fully expanded (Figure 7). Therefore, at temperatures of 90° or higher, the piston 84 and the body 83 tend to oppose one another. The piston 84 thrusts into the counterbore 93 and bears against the set screw 91 which is firmly secured in the neck portion 89 of the support yoke 87 which, in turn, is secured by the machine screws 88 in the prongs 74 of the housing 64. Thus, the body 83 tends to move to the left but is limited when the shoulder of body 83 bears against the spring sleeve 92 which, in turn, is urged against the coil spring 94. The coil spring 94 is compressed because it is confined by the arcuate shoulders 85 of the prongs 74. It should be noted that the spring sleeve 92 slides through the shoulders 85 and around the pin 101 so that the flange 99 of the pin 101 no longer bears against the spring sleeve 92.

At 80°, or less, tensioning thermostat 80 is in its fully contracted position (Figure 6). Under these conditions the piston 84 is loosely supported in the counterbore 93 of the set screw 91 and the coil spring 94 urges the spring sleeve 92 to the right against the resistance of the thermostatic element body 83 until it is ultimately limited when it encounters the flange 99 of the pin 101.

It should be noted that although the thermostats 80 and 100 are in communication with and respond to the temperature of the conditioned air within the ducts of the air distribution system, the room thermostat 60 is designed to respond to the average temperature of the air in the space or zone which is to be temperature conditioned and partakes of the space temperature by virtue of the air movement induced to flow from the room or zone into the thermostat assembly.

As may be seen on the drawings, air flows into the space 75 between the ribs 65 and then to the enclosure 53 of the aspirator structure. Thus, variations in temperature of the room to be temperature conditioned will result in relative linear displacement of the piston 67 and the body 68. These displacements are transmitted to the rod portion 70 of the spacer 69 and thence to the tension fork 79.

Referring particularly to Figure 6, it should be noted that the conical spring 76, confined by the annular shoulder 73 of the housing 64, bears against the retainer 77 which is in threaded relationship with the tension fork 79, thereby tending to urge the room thermostat assembly 60 toward the right. Inasmuch as the adjusting knob 61 is threadedly engaged with the housing 64 at 62 and since the body 68 is confined by the ribs 65 of the knob 61, rotative manipulation of the knob 61 will alter the lineal relationship between the tension fork 79 and the room thermostat 60 and thus alter the position assumed by the shutter 19 for any given relative linear displacement between the piston 67 and the body 68, thereby permitting a selective calibration of knob 61 with respect to the operating temperature range of the room thermostat.

Heating

If the distribution system is being used for heating purposes, the conditioning air is heated to at least 90° F. In this range the reversing thermostat 100 and the tensioning thermostat 80 are fully expanded (Figure 7). The room thermostat members 60 undergo relative linear displacement in response to room temperature variations transmitted through the tension fork 79 to the projecting walls 82, then through pin stops 116, through the thermostat elements to the bobbin 102, screws 105, and plug 104. Because of the restriction placed upon the tension cord 41 by the socket lamp 107 bearing against the plug 104, the variations in linear displacement of the room thermostat 60 result in tension changes of the tension cord 41 which, in turn, cause the shutter 19 to open or close.

Neutral

If the temperature of the conditioned air drops to 80°, the air distribution system is in the so-called neutral phase. The reversing thermostat 100 is fully expanded so there is no change in that unit. However, the tensioning thermostat 80 is now in its fully contracted condition Figure 6), therefore, coil spring 94 has urged the spring sleeve 92 to the right so that the flange 99 of the pin 101 is seated against the ends of the spring sleeve 92.

It should be noted at this point that only a slight motion of the spring sleeve 92 is necessary to engage or disengage the flange 99 and the extent of the displacement necessary may be manually adjusted by a suitable positioning of the set screw 91 in the neck portion 84 of the support yoke 87. Thus, engagement or disengagement of the flange 99 with the spring sleeve 92 may be made to occur in the first small relative motion of the thermostatic device body 83 and the piston 84.

When the flange 99 engages the spring sleeve 92, it is apparent that the expansive force of the coil spring 94 is transmitted through the spring sleeve 92 and the flange 99 to the pin 101 and thence to the bobbin 102 threadedly engaged with the pin 101 at 115. Thus, the bobbin 102 tends to the right and places the tension wire 41 under increased tension causing the shutter 19 to open thereby permitting a continuous free flow of ventilating air from the air distribution system into the given space.

Cooling

When the temperature of the conditioned air falls below 70° F., both the reversing thermostat and the tensioning thermostat are completely contracted (Figure 8). Therefore, the coil spring 94 continues to urge the spring sleeve 92 to the right which, in turn, engages the flange 99 of the pin 101 and causes the bobbin 102 to tend to the right. Inasmuch as the reversing thermostat is fully contracted, the coil spring 108 has urged the body 109 toward the right so that the flange 112 has moved away from the pin stops 116 toward engagement with the end surfaces 123 of the beams 120. The pin stops 117 engage the adjustable flange 118 which is in threaded relationship with the yoke 119, therefore, when a temperature decrease occurs in the room, space or zone, the projecting walls 82 of the tension fork 87 are urged to the right by the action of the coil spring 76 conjointly with the action of the temperature responsive elements of the room thermostat 60. The displacement of the projecting walls 82 is imparted to the adjustable flange 118 by the pin stops 117 and thence to the yoke 119 causing the beams 120 to pivot about the fulcrum pins 121, thereby engaging and pressing leftward the flange 112 at the cam surfaces 123. The resulting force is transmitted to the bobbin 102 by the body 109 and the coil spring 108 and tends to decrease the tension created on the tension cord 41 by the coil spring 94, thus causing shutter 19 to close.

When a temperature increase occurs in the room, space or zone, the projecting walls 82 will tend toward the left and move the pin stops 117 leftward. This permits a leftward motion of the adjustable flange 118 and the yoke 119 and allows the beams 120 to rotate about the fulcrum pins 121 and the cam surfaces 123 to move rightward. This, in turn, permits the bobbin 102 to move rightward under the urging of the coil spring 94 and thus tension the cord 41 causing the shutter 19 to open.

Attention is drawn to the fact that the adjustable flange 118 may be selectively positioned by virtue of the threaded engagement with the yoke 119. Thus, the limits of engagement or disengagement of the adjustable flange 118 with the pin stops 117 may be controlled accurately and positively by appropriate manual adjustment.

From the foregoing it should be seen that I have provided an automatic thermostatically controlled ventilator capable of responding to the temperature requirement of spaces or zones served by an air temperature conditioning distribution system even though the spaces are likely to have variable requirements necessitating alternate heating, cooling, or only ventilation. It should be further apparent that I have provided a temperature responsive device which secures automatic control of the heating, cooling or ventilating requirements of various spaces or zones by means of a controller responsive to the temperature conditions of the various zones and in which the controller is automatically changed from or to conditions suitable for heating operations, cooling operations or ventilating operations in response to the temperature of the conditioning air.

It will be apparent that many changes will suggest themselves to those skilled in the art. I, therefore, desire to be limited only by the scope of the appended claims and the prior art.

I claim as my invention:

1. In a control device associated with a temperature conditioning air system serving a plurality of spaces of the type wherein a damper means supported by a cord suspension having been urged toward an open position by a predetermined torsional stress is controlled by selectively varying said torsional stress with axial displacement of elements which expand or contract in response to temperature variations, in combination, an adjustable temperature sensitive device of the type which operates to vary the linear alignment of its members in response to changes in temperature normally operable to close said damper when the room temperature rises, a second temperature sensitive device of the type which operates to vary the linear alignment of its members associated with first said device aforementioned operable to tensionally stress said cord suspension within a determinable temperature range so as to maintain said damper open within determinable limits, a third temperature sensitive device of the type which operates to vary the linear alignment of its members and a leverage arrangement comprising a yoke and two beams, said beams pivotally connected with housing of said first device; said third device associated with said leverage arrangement and these two in turn associated with said first and second devices operable to reverse the normal operation of said shutter within a determinable temperature range so as to cause said shutter to open when room temperature rises.

2. In a heating and cooling ventilator register of the type wherein a damper means is supported by a cord suspension, said damper being normally urged to an open position by a torsional stress and said damper being regulated by controlling said torsional stress, the improvement comprising, in combination, a control mechanism having three temperature sensitive devices of the type which operate to vary the linear alignment of their members in response to temperature variations and a leverage arrangement associated therewith, the number one device normally operable over a manually adjustable range to close said damper means upon a rise in temperature in a room being heated, number two device adjusted to be actuated within a limited temperature range and normally operable to open said damper when a room is neither to be heated or cooled, number three device adjusted to be actuated within a determinable temperature range so as to engage said lever arrangement connected with housing of number one device, the joint action of said devices and lever arrangement operable to open said damper means upon a rise in temperature of the room to be cooled within determinable temperature limits.

3. A thermostatic regulating device in control of a torsionally balanced, cord suspended damper positioned in a duct leading from an air temperature conditioning system to a given space, comprising, in combination, a room thermostat having a dimension varying in response to temperature changes, an aspirator structure associated with said room thermostat to permit said thermostat to partake of average room temperature, a spring means associated with said room thermostat, a rotatively adjustable shell retainer cooperating with said spring means and said thermostat for establishing and controlling a calibrated actuating range for said thermostat, a link member connecting said thermostat to said cord suspended damper, said thermostat normally operable to close said damper upon a rise of room temperature under heating operation, a tensioning thermostat of the type which operates to vary the linear alignment of its members in response to temperature changes, a coil spring cooperating with said tensioning thermostat, said tensioning thermostat and said spring associated with said room thermostat and said damper operable to open said damper within determinable limits of a selective temperature range by spring biasing of said cord suspended damper, a reversing thermostat of the type which operates to vary the linear alignment of its members in response to temperature changes, a pair of pivotally mounted lever arms connected with the housing structure of said room thermostat, a manually adjustable supporting structure connected to said lever arms, a plurality of pin stops attached to said link member of said room thermostat operable to engage said adjustable supporting structure, said reversing thermostat and said lever arms cooperating with said room thermostat within a pre-determined temperature range to overcome said spring bias of said tensioning thermostat causing said damper to open upon a rise in room temperature under cooling operation.

4. As an article of manufacture, an auxiliary mechanism for a thermostatic control device of the type described herein, said mechanism comprising, in combination, a hollow cylindrical knob threadedly received in a die-cast metal member, said member being shaped cylindrically on one end and having a pair of parallel prongs extending in a direction opposite said knob, a spring means housed in said metal member, said spring means and a first thermostatic device located in said knob adjustably related in resilient engagement within said metal member and said knob by suitable spacer means, a yoke member attached to said spacer means having a pair of parallel legs extending between said parallel prongs, said legs and said prongs defining a chamber for housing a second thermostatic device and a second spring means, said second device and said second spring means resiliently engageable through a spring sleeve in said chamber, a flanged pin selectively engageable with said spring sleeve and threadedly connected to a bonnet disposed between said legs of said yoke, said bonnet and said legs defining a compartment for housing a third thermostatic device and a third spring means, said third spring and said third device resiliently engageable within the confines of said bonnet, a plug fitted in said bonnet for receiving a tension cord of a cord suspended shutter, a leverage mechanism fixed in said prongs, and pin stops arranged in said legs for engaging said third thermostatic device and said leverage mechanism, said auxiliary mechanism operable to transmit linear variations of said first thermostatic device to said tension cord in response to temperature reductions when said second thermostatic device is activated and operable to transmit a tension to said tension cord when said second thermostatic device is inactivated and further operable to transmit linear variations of said first thermostatic device to said tension cord through said leverage mechanism in response to temperature increments when said second and third thermostatic devices are inactivated.

5. A thermostatic regulating device in control of a torsionally balanced, cord-suspended, butterfly-type damper positioned in a duct leading from an air temperature conditioning system to a given space comprising, in combination, a yoke member engaging a first thermostatic device operable to change relative linear displacement in response to variations in a first predetermined temperature range, said yoke having a pair of extending parallel legs, a housing for said first thermostatic device having a pair of extending parallel prongs, a bonnet located between said legs of said yoke connected to a single tension cord of said cord suspended damper, a second thermostatic device associated with a spring means engaging said prongs and said yoke for applying a fixed, predetermined amount of force to said tension cord in response to temperatures in a second predetermined range, a leverage mechanism pivotally mounted in said prongs, a third thermostatic device associated with a spring means engaging said bonnet, said third thermostatic device operable to apply a fixed, predetermined amount of force against said leverage mechanism in response to temperatures in a third predetermined range thereby reversing the axial direction of said linear displacement of said first thermostatic device, said regulating device operable to selectively open and close said damper in response to temperature changes for heating control in said first range, ventilating control in said second range and cooling control in said third range of temperature.

6. In a duct control device for a temperature conditioning system, a rotatable shutter adapted to control the flow of a temperature conditioned fluid through a duct, support means including twisted suspension members to carry said shutter and to pre-load the shutter torsionally, a first tensioning means connected to said suspension members including a temperature sensitive device of the type which operates to vary the linear alignment of its members in response to changes in temperature, normally operable to close said shutter when the room temperature rises, a second tensioning means including a temperature sensitive device of the type which operates to vary the linear alignment of its members associated with said first tensioning means to tensionally stress said suspension members in a determinable temperature range to maintain said shutter open within determinable limits, a third tensioning means including a temperature sensitive device of the type which operates to vary the linear alignment of its members and coupling means connecting said first and said third tensioning means to reverse the normal operation of said shutter within a predetermined temperature range to open said shutter when the room temperature rises.

7. In a duct control device as defined in claim 6, said first tensioning means including adjustment means to selectively vary the effective range thereof.

8. In an air flow controller, a housing defining an air passage adapted to carry temperature conditioned air, a rotatable shutter in control of the air flow through said passage, suspension members between said shutter and the housing being twisted to torsionally load the shutter and tensioning means connected to the suspension members for controlling rotation of the shutter by variably tensioning the suspension members to change the torsion load of the shutter, said tensioning means including a first thermostatic means to deliver variable tensioning loads in response to temperature variations to close said shutter in response to a temperature increase for heating operation and a second thermostatic load delivering means coupled to said first thermostatic means to reverse the normal operation thereof throughout a predetermined temperature range, thereby to open said shutter in response to a temperature increase for cooling operation.

9. In an air flow controller as defined in claim 8, said tensioning means further including additional thermally responsive load-delivering means to hold said shutter open throughout a predetermined temperature range for ventilating operation.

10. In an air flow controller, a housing defining an air passage, a rotatable shutter in control of air flow through said passage, suspension members between the shutter and the housing and being twisted to torsionally load the shutter and tensioning means connected to the suspension members for controlling rotation of the shutter by variably tensioning the suspension members to change the torsional load on the shutter, said tensioning means including a thermostatic means to deliver variable tensioning loads to close said shutter in response to temperature variations, said tensioning means further including additional thermally responsive load delivering means to hold said shutter open throughout a predetermined temperature range for ventilating operation.

11. Air flow control apparatus comprising, a damper, a duct controlled thereby, suspension means rotatably suspending said damper in said duct, torsional means stressing said damper towards one position of balance, a first thermostatic means connected to said damper and overcoming the torsional stress on said damper by a force directed axially of said damper in response to temperature variations throughout a first predetermined temperature range for turning the damper towards another position as for heating control, a second thermostatic means connected to said damper and overcoming the torsional stress on said damper by a predetermined force directed axially to said damper in response to temperatures in a second predetermined range for holding said damper open as for ventilating purposes, and a third thermostatic means connected to said damper and overcoming the torsional stress on said damper by a force reversely applied axially to the damper in response to temperature variations in a third predetermined range for turning the damper towards another position as for cooling control.

BRUCE GRAY COPPING.

REFERENCES CITED

The following references are of record in the file of this patent:

UNITED STATES PATENTS

| Number | Name | Date |
| --- | --- | --- |
| 1,656,372 | Fitts | Jan. 17, 1928 |
| 1,833,950 | Modine | Dec. 1, 1931 |
| 2,241,108 | Akers | May 6, 1941 |
| 2,318,706 | Newton | May 11, 1943 |
| 2,447,560 | Branson | Aug. 24, 1948 |
| 2,463,600 | Carson | Mar. 8, 1949 |
| 2,523,499 | Copping | Sept. 26, 1950 |